United States Patent
Kim (10) Patent No.: US 11,370,479 B2
(45) Date of Patent: Jun. 28, 2022

(54) APPARATUS FOR AND METHOD OF COMPENSATING FOR STEERING ERROR IN ADVANCED DRIVING ASSISTANCE SYSTEM

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 57 days.

(21) Appl. No.: 16/817,308

(22) Filed: Mar. 12, 2020

(65) Prior Publication Data

US 2021/0094611 A1    Apr. 1, 2021

(30) Foreign Application Priority Data

Sep. 26, 2019   (KR) .................. 10-2019-0118662

(51) Int. Cl.
*B62D 5/04*    (2006.01)
*B62D 6/00*    (2006.01)

(52) U.S. Cl.
CPC ......... *B62D 5/0493* (2013.01); *B62D 5/0484* (2013.01); *B62D 6/002* (2013.01); *B62D 5/0463* (2013.01)

(58) Field of Classification Search
CPC .... B62D 5/0493; B62D 5/0484; B62D 6/002; B62D 5/0463
See application file for complete search history.

(56) References Cited

U.S. PATENT DOCUMENTS

| | | | | | |
|---|---|---|---|---|---|
| 4,830,127 | A | * | 5/1989 | Ito | B62D 6/008 180/446 |
| 10,155,531 | B2 | * | 12/2018 | Champagne | B62D 6/001 |
| 10,435,063 | B2 | * | 10/2019 | Benak | B62D 6/00 |
| 2006/0095188 | A1 | * | 5/2006 | Post | B62D 6/00 701/70 |
| 2015/0158528 | A1 | * | 6/2015 | Moshchuk | B62D 15/0265 701/41 |

(Continued)

FOREIGN PATENT DOCUMENTS

| DE | 102012005116 A1 * | 9/2013 | .......... B62D 5/0481 |
|---|---|---|---|
| JP | 2018-039419 A | 3/2018 | |

(Continued)

OTHER PUBLICATIONS

Translation of JP 2018039419 (Year: 2018).*
Office Action of corresponding Korean Patent Application No. 10-2019-0118662—4 pages (Jun. 22, 2020).

*Primary Examiner* — Jeff A Burke
*Assistant Examiner* — Jerrod Irvin Davis
(74) *Attorney, Agent, or Firm* — NSIP Law (57) ABSTRACT

Disclosed are an apparatus for and a method of compensating for a steering error in an advanced driving assistance system, and the apparatus includes a command steering angle correction module that corrects a command steering angle according to whether or not the command steering angle input from the advanced driving assistance system satisfies a preset error compensation condition; and a motor control unit that controls a motor of a motor-driven power steering system according to the command steering angle corrected by the command steering angle correction module.

15 Claims, 8 Drawing Sheets

(56) References Cited

U.S. PATENT DOCUMENTS

| | | | | |
|---|---|---|---|---|
| 2016/0288831 A1* | 10/2016 | Lee | ........................ | B60W 30/10 |
| 2017/0072996 A1* | 3/2017 | Hong | .................... | B62D 5/0484 |
| 2018/0105204 A1* | 4/2018 | Lee | .......................... | B62D 6/00 |
| 2019/0337556 A1* | 11/2019 | Tsubaki | ................ | B62D 15/025 |
| 2019/0367079 A1* | 12/2019 | Kodera | .................. | B62D 6/002 |
| 2020/0086911 A1* | 3/2020 | Stahl | .................... | B62D 5/0481 |
| 2020/0198699 A1* | 6/2020 | Lee | ........................ | B62D 1/265 |
| 2020/0254996 A1* | 8/2020 | Kashiwamura | ........... | B60T 7/22 |
| 2020/0324812 A1* | 10/2020 | Matsuo | ................ | B62D 15/025 |
| 2021/0188355 A1* | 6/2021 | Wulf | .................... | B62D 15/025 |

FOREIGN PATENT DOCUMENTS

| | | | | |
|---|---|---|---|---|
| JP | 2020189531 A | * | 11/2020 | |
| KR | 10-2013-0044734 A | | 5/2013 | |

\* cited by examiner

APPARATUS FOR AND METHOD OF COMPENSATING FOR STEERING ERROR IN ADVANCED DRIVING ASSISTANCE SYSTEM

CROSS-REFERENCE TO RELATED APPLICATION

The present application claims priority under 35 U.S.C. § 119(a) to Korean Patent Application No. 10-2019-0118662 filed on Sep. 26, 2019 in the Korean Intellectual Property Office, which is incorporated herein by reference in its entirety.

BACKGROUND

1. Technical Field

Embodiments of the present disclosure relate to an apparatus for and a method of compensating for a steering error in an advanced driving assistance system, and more particularly, to an apparatus for and a method of compensating for a steering error in an advanced driving assistance system, which compensate for an abnormal command steering angle input from the advanced driving assistance system, and thus ensure the stability of vehicle driving.

2. Related Art

An advanced driving assistance system (ADAS) assists a driver in driving a vehicle. The ADAS senses a situation in front of the vehicle, determines the situation on the basis of a result of the sensing, and controls the vehicle driving. For example, a sensing device in the ADAS detects a forward vehicle and recognizes a lane. Subsequently, when a target lane, a target speed, and a forward target are determined, an electrical stability control (ESC), an engine management system (EMS), a motor-driven power steering (MDPS), and the like in the vehicle are controlled. Typically, the ADAS may be realized as an automatic parking system, a low-speed city driving assistance system, and a blind zone warning system, or the like.

The MDPS here adjusts motor driving according to a driving speed of the vehicle and thus controls steering power of a steering wheel. Specifically, MDPS controls the steering power, in a manner that requires less steering effort, during parking or low-speed driving and controls the steering power, in a manner that requires more steering effort, during high-speed driving, thereby providing the stability for high-speed driving.

Particularly, when the command steering angle is input from the advanced driving assistance system, the MDPS performs steering control according to the command steering angle. At this time, in a case where an error occurs in the advanced driving assistance system, the MDPS performs the steering control according to an abnormal command steering angle. This creates a need to secure a safety technology that enables the MDPS to autonomously detect or deal with the abnormal command steering angle.

An MDPS in the related art has a fail-safe function inside, but the fail-safe function is to deal with an error in the MDPS itself. Thus, the fail-safe function is still inadequate to deal with the abnormal command steering angle input from the advanced driving assistance system.

The related art of the present disclosure is disclosed in Korean Patent Application Laid-Open No. 10-2013-0044734 (May 3, 2013) entitled "FAIL-SAFE CONTROL METHOD AND APPARATUS FOR VEHICLE ORIENTATION CONTROL."

SUMMARY

Various embodiments are directed to an apparatus for and a method of compensating for a steering error in an advanced driving assistance system that compensate for an abnormal command steering angle input from the advanced driving assistance system and thus ensure the stability of vehicle driving.

In an embodiment, an apparatus for compensating for a steering error in an advanced driving assistance system, the apparatus includes: a command steering angle correction module configured to correct a command steering angle according to whether or not the command steering angle input from the advanced driving assistance system satisfies a preset error compensation condition; and a motor control unit configured to control a motor of a motor-driven power steering system according to the command steering angle corrected by the command steering angle correction module.

In an embodiment, the command steering angle correction module is configured to include: a command steering angle restriction module configured to detect lateral acceleration on the basis of the command steering angle and to restrict the command steering angle according to the lateral acceleration; a vibration attenuation module configured to detect a change in sign, of the command steering angle, due to abnormal vibration in a leftward and rightward direction, of the command steering angle and to attenuate the abnormal vibration at the command steering angle according to the detected change in sign; and a command steering angle attenuation module configured to detect an amount of change in the command steering angle and to decrease the command steering angle according to the amount of change in the command steering angle.

In an embodiment, the command steering angle attenuation module is configured to include: an amount-of-change detection unit configured to detect an amount of change in the command steering angle; and a command steering angle attenuation unit configured to compare the amount of change in the command steering angle, which is detected by the amount-of-change detection unit, with a preset setting value of the amount of change in the command steering angle, and to decrease the amount of change in the command steering angle according to a result of the comparison.

In an embodiment, the vibration attenuation module is configured to include: a vibration detection unit configured to detect the abnormal vibration at the command steering angle on the basis of the number of times that a steering angular velocity of the command steering angle changes in sign; and a filter unit configured to remove a vibration frequency according to the number of times that the steering angular velocity detected by the vibration detection unit changes in sign.

In an embodiment, the vibration detection unit is configured to determine whether or not the number of times that the steering angular velocity changes in sign for a preset setting time is equal to or greater than the preset setting number of times that the change in sign occurs.

In an embodiment, the filter unit is configured to: detect a vibration frequency according to the number of times that the steering angular velocity changes in sign, set a center frequency according to the vibration frequency, and remove the vibration frequency according to the center frequency.

In an embodiment, the command steering angle restriction module is configured to include: a vehicle modeling unit configured to detect the lateral acceleration on the basis of the command steering angle and a vehicle speed, and to detect a maximum necessary steering angle that is possible at a current vehicle speed, according to the lateral acceleration, using a vehicle model; and a command steering angle restriction unit configured to detect a necessary reduction steering angle on the basis of the command steering angle and to impose the restriction of decreasing the command steering angle by the necessary reduction steering angle.

In an embodiment, the vehicle modeling unit is configured to detect the necessary steering angle when the lateral acceleration is at or above a preset setting value of the lateral acceleration.

In an embodiment, a method of compensating for a steering error in an advanced driving assistance system includes: correcting, by a command steering angle correction module, a command steering angle according to whether or not the command steering angle input from the advanced driving assistance system satisfies a preset error compensation condition; and controlling, by a motor control unit, a motor of a motor-driven power steering system according to the command steering angle corrected by the command steering angle correction module.

In an embodiment, the correcting of the command steering angle is configured to include: detecting lateral acceleration on the basis of the command steering angle and restricting the command steering angle according to the lateral acceleration; detecting a change in sign, of the command steering angle, due to abnormal vibration in a leftward and rightward direction, of the command steering angle and attenuating the abnormal vibration at the command steering angle according to the detected change in sign; and detecting an amount of change in the command steering angle and decreasing the command steering angle according to the amount of change in the command steering angle.

In an embodiment, the decreasing of the command steering angle is configured to include: detecting the amount of change in the command steering angle; and comparing the amount of change in the command steering angle with a preset setting value of the amount of change in the command steering angle and decreasing the amount of change in the command steering angle according to a result of the comparison.

In an embodiment, the attenuating of the abnormal vibration at the command steering angle is configured to include: detecting the abnormal vibration at the command steering angle on the basis of the number of times that a steering angular velocity of the command steering angle changes in sign; and removing a vibration frequency according to the number of times that the steering angular velocity changes in sign.

In an embodiment, the detecting of the abnormal vibration at the command steering angle is configured to determine whether or not the number of times that the steering angular velocity changes in sign for a preset setting time is equal to or greater than the preset setting number of times that the change in sign occurs.

In an embodiment, the removing of the vibration frequency is configured to detect the vibration frequency according to the number of times that the steering angular velocity changes in sign, to set a center frequency according to the vibration frequency, and to remove the vibration frequency according to the center frequency.

In an embodiment, the decreasing of the command steering angle is configured to include: detecting the lateral acceleration on the basis of the command steering angle and a vehicle speed, and detecting a maximum necessary steering angle that is possible at a current vehicle speed, according to the lateral acceleration, using a vehicle model; and detecting a necessary reduction steering angle on the basis of the command steering angle and imposing the restriction of decreasing the command steering angle by the necessary reduction steering angle.

In an embodiment, the detecting of the necessary steering angle using the vehicle model is configured to detect the necessary steering angle when the lateral acceleration is at or above a preset setting value of the lateral acceleration.

The apparatus for and the method of compensating for a steering error in an advanced driving assistance system according to an aspect of the present disclosure compensate for the abnormal command steering angle input from the advanced driving assistance system and thus ensure the stability of vehicle driving and the safety of a driver.

DETAILED DESCRIPTION

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for and a method of compensating for a steering error in an advanced driving assistance system will be described below in detail with reference to the accompanying drawings through various examples of embodiments.

For clarity and convenience in this description, thicknesses of lines, sizes of constituent elements, and the like are illustrated in an exaggerated manner in the drawings. In addition, terms that will be used below are defined by considering functions for which the terms are used according to the present disclosure, and may vary according to the intention of a user or a manager or according to the common practice in the art. Therefore, definitions of these terms should be stated in light of details disclosed throughout the present specification.

A realization described in the present specification, for example, may take place in the form of a method, a process, an apparatus, a software program, a data stream, or a signal. Although a realization of a feature is described only in the context of a single form (for example, described only in the context of the form of a method), the realization of the feature, which is described, may also take place in a different form (for example, an apparatus or a program). The apparatus may be realized in suitable hardware, software, firmware, or the like. The method, for example, may be realized in an apparatus, such as a computer, a microprocessor, or a processor that generally refers to a processing device, such as an integrated circuit or a programmable logic device. The apparatuses also include a computer that facilitates communication of information between end users, a cellular phone, and communication devices such as a mobile information terminal, a personal digital assistant (PDA) and other devices.

Figure 1:
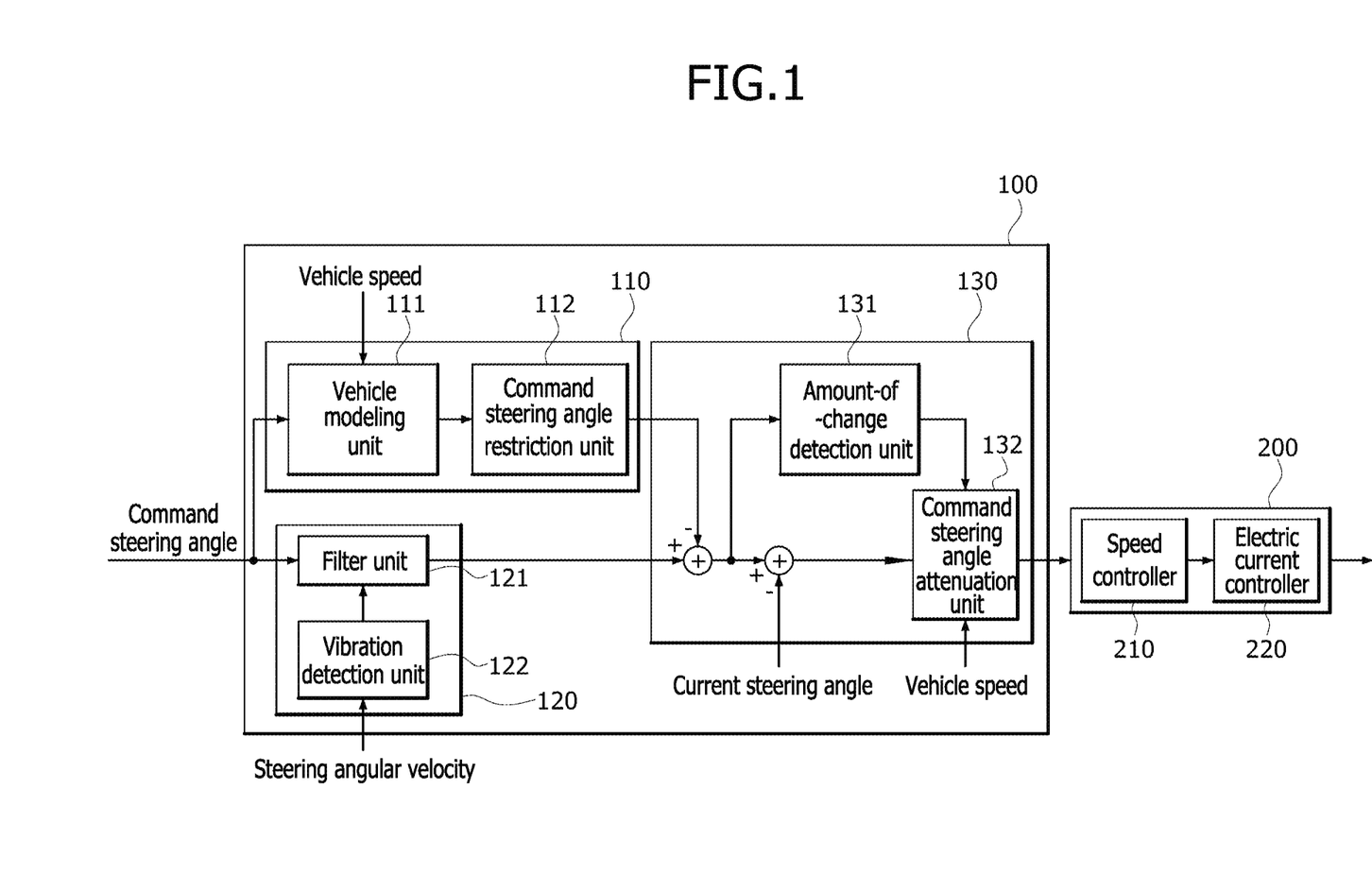
FIG. 1 is a block diagram illustrating a configuration of an apparatus for compensating for a steering error in an advanced driving assistance system according to an embodiment of the present disclosure.
Figure 2:
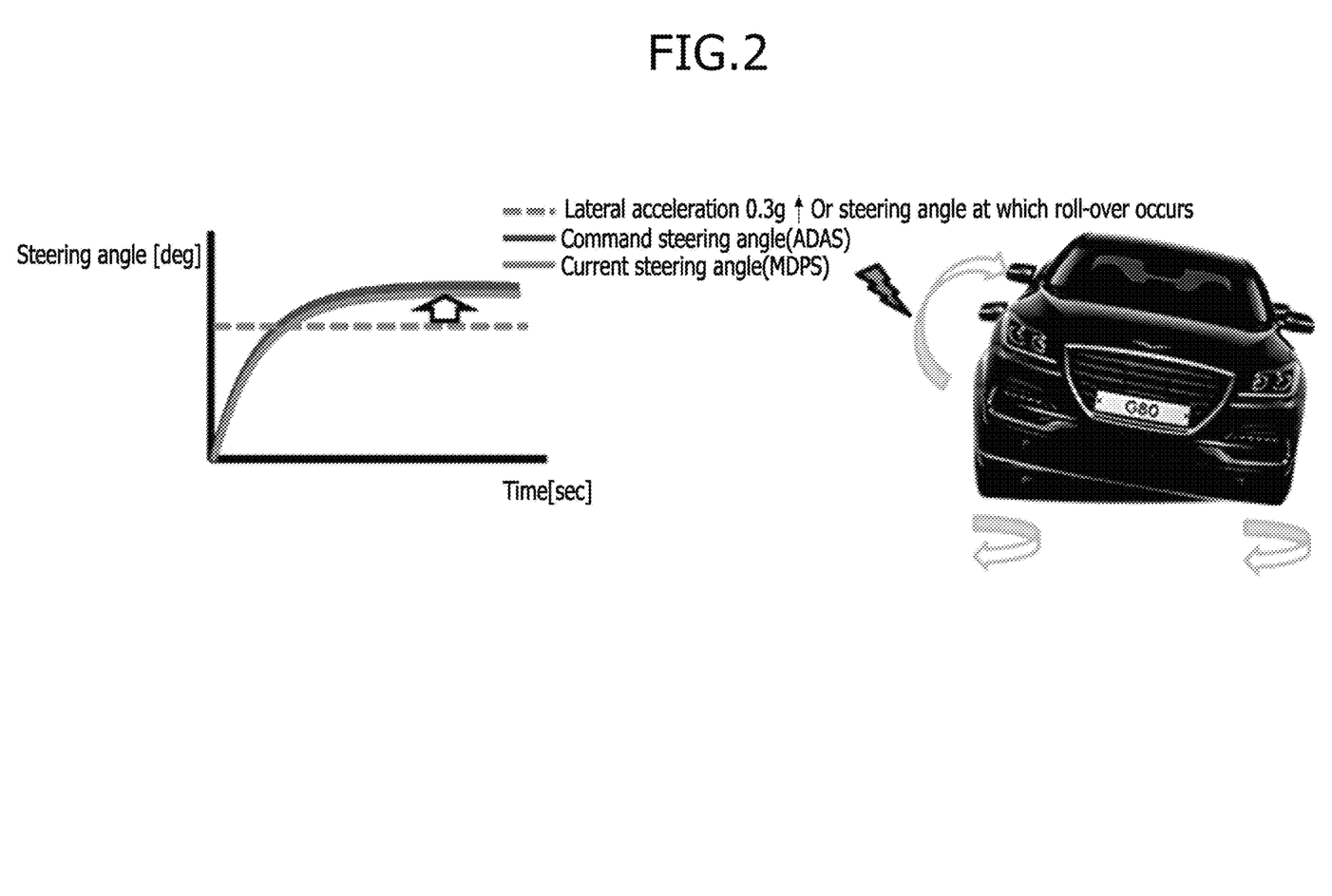
FIG. 2 is a diagram illustrating a steering angle change due to a command steering angle at or above a threshold or at a level that can cause roll-over, according to the related art.
Figure 3:
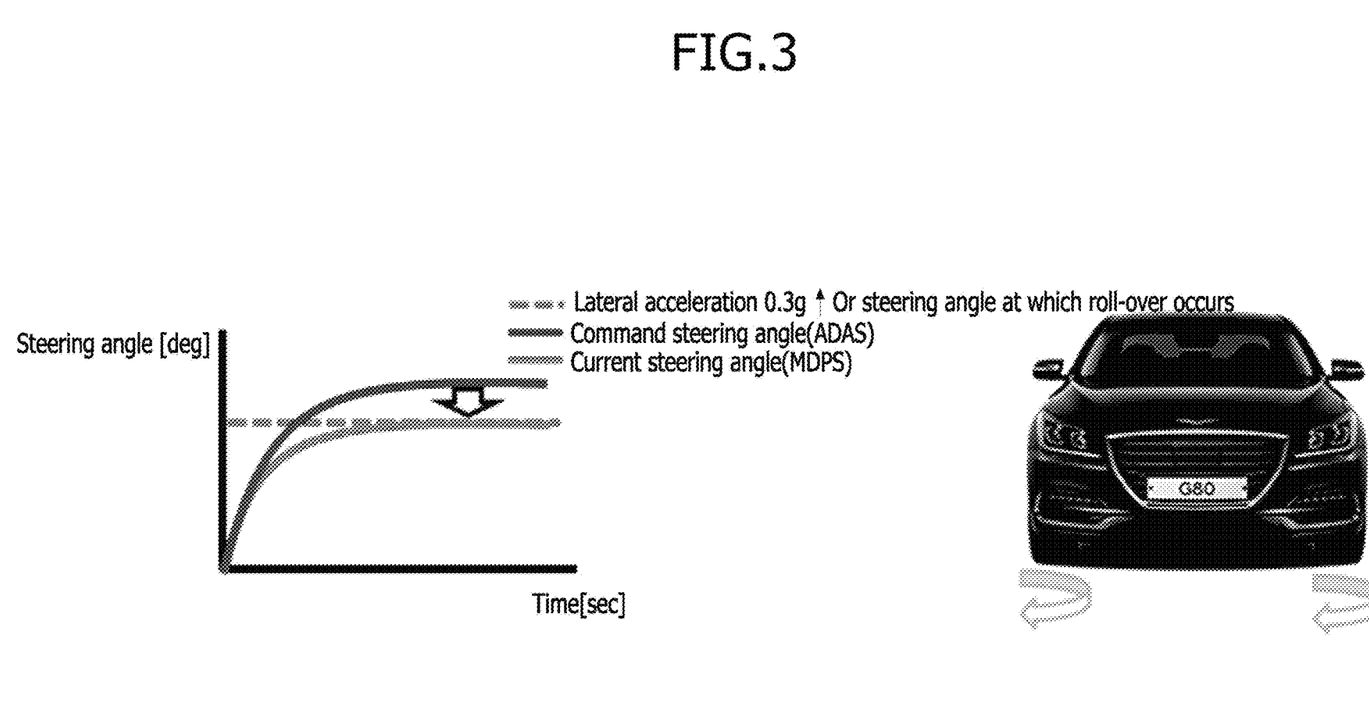
FIG. 3 is a diagram illustrating a steering angle change due to a command steering angle at or above a threshold or at a level that can cause roll-over, according to an embodiment of the present disclosure.
Figure 4:
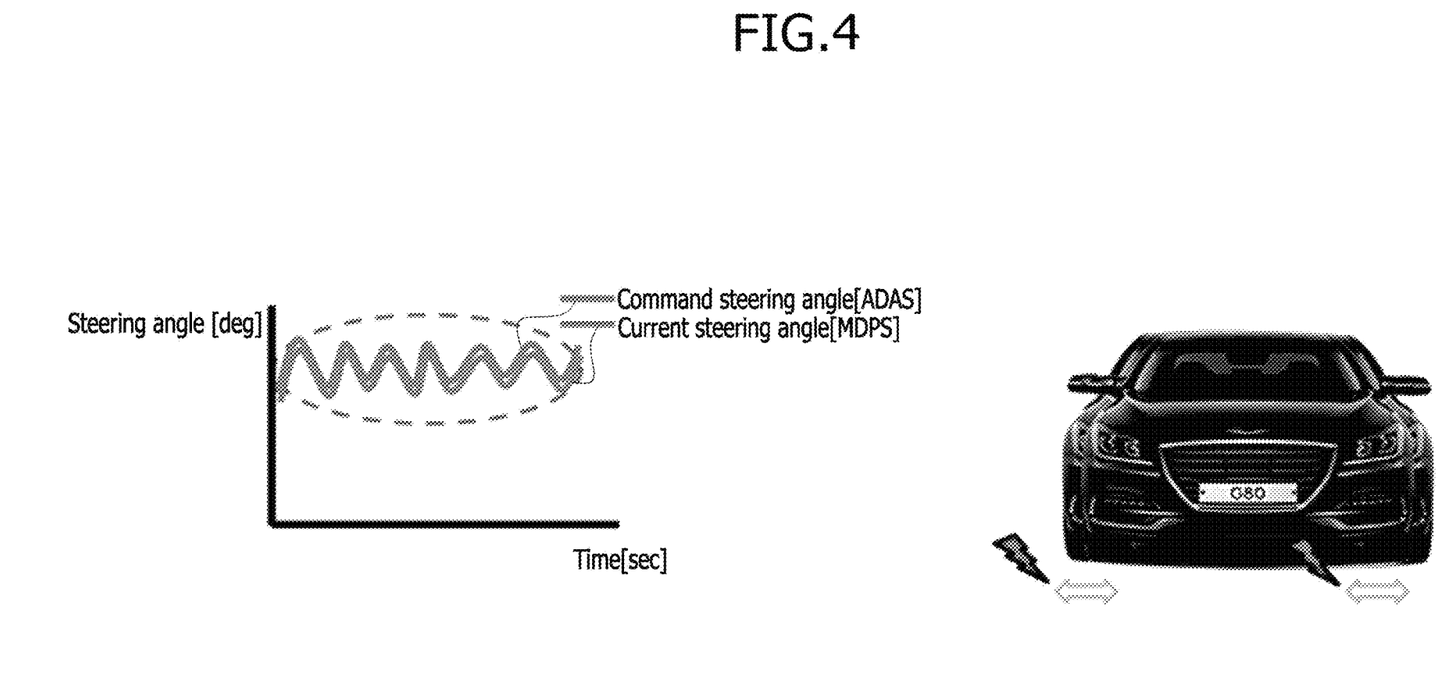
FIG. 4 is a diagram illustrating a steering angle change due to noise or a meaningless leftward and rightward command steering angle, according to the related art.
Figure 5:
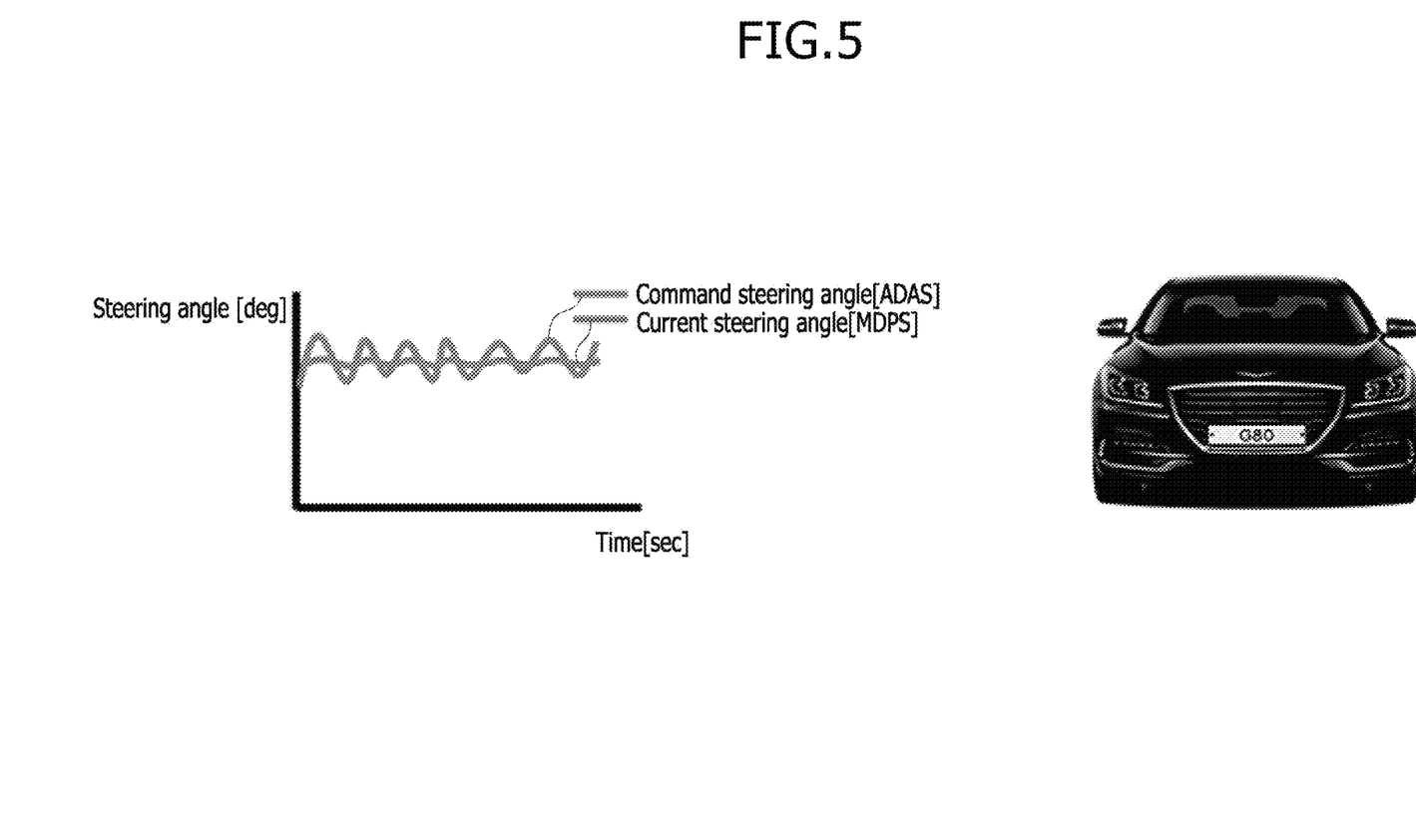
FIG. 5 is a diagram illustrating a steering angle change due to noise or a meaningless leftward and rightward command steering angle, according to an embodiment of the present disclosure.
Figure 6:
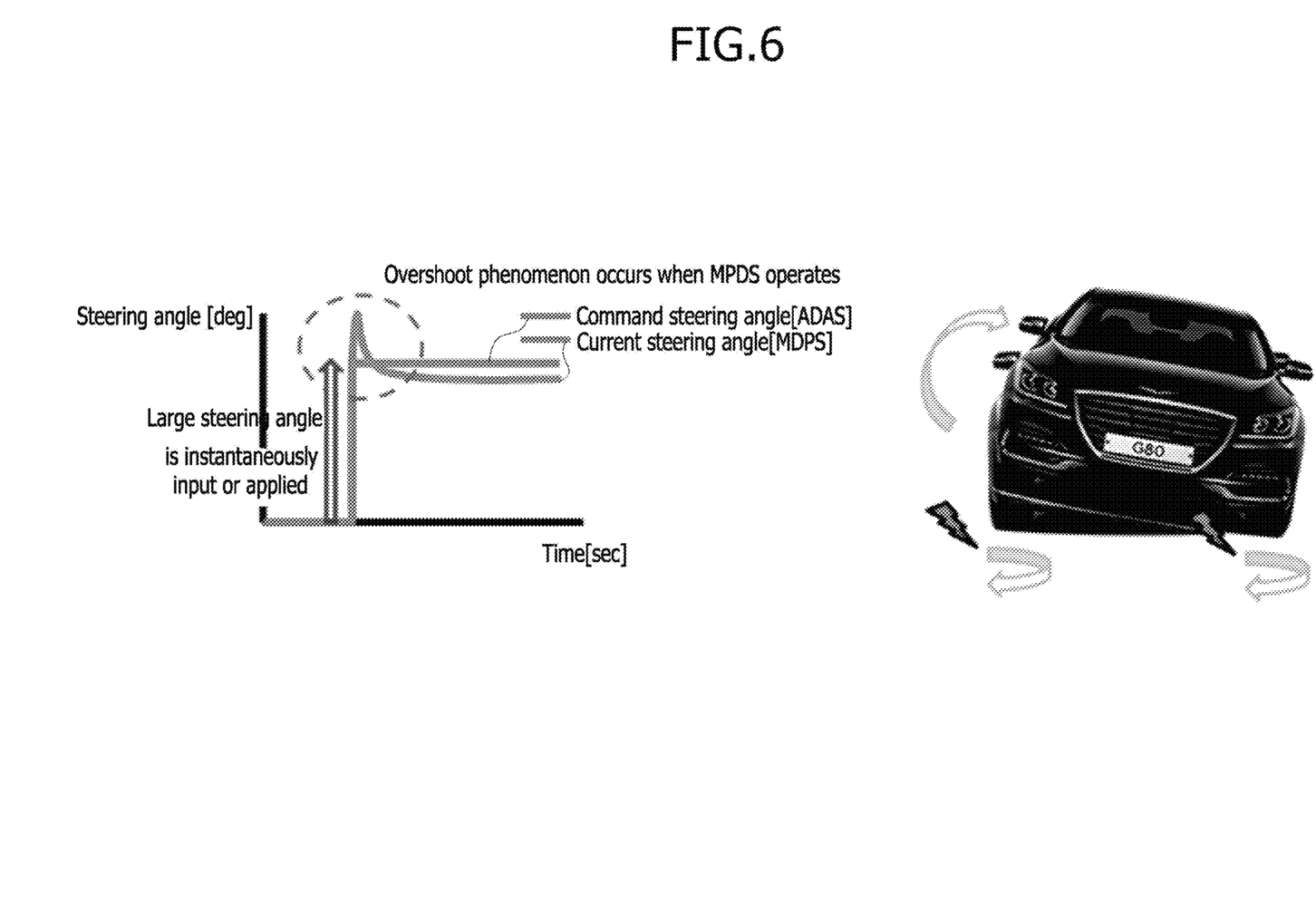
FIG. 6 is a diagram illustrating a steering angle change due to an abnormally-large command steering angle, according to the related art.
Figure 7:
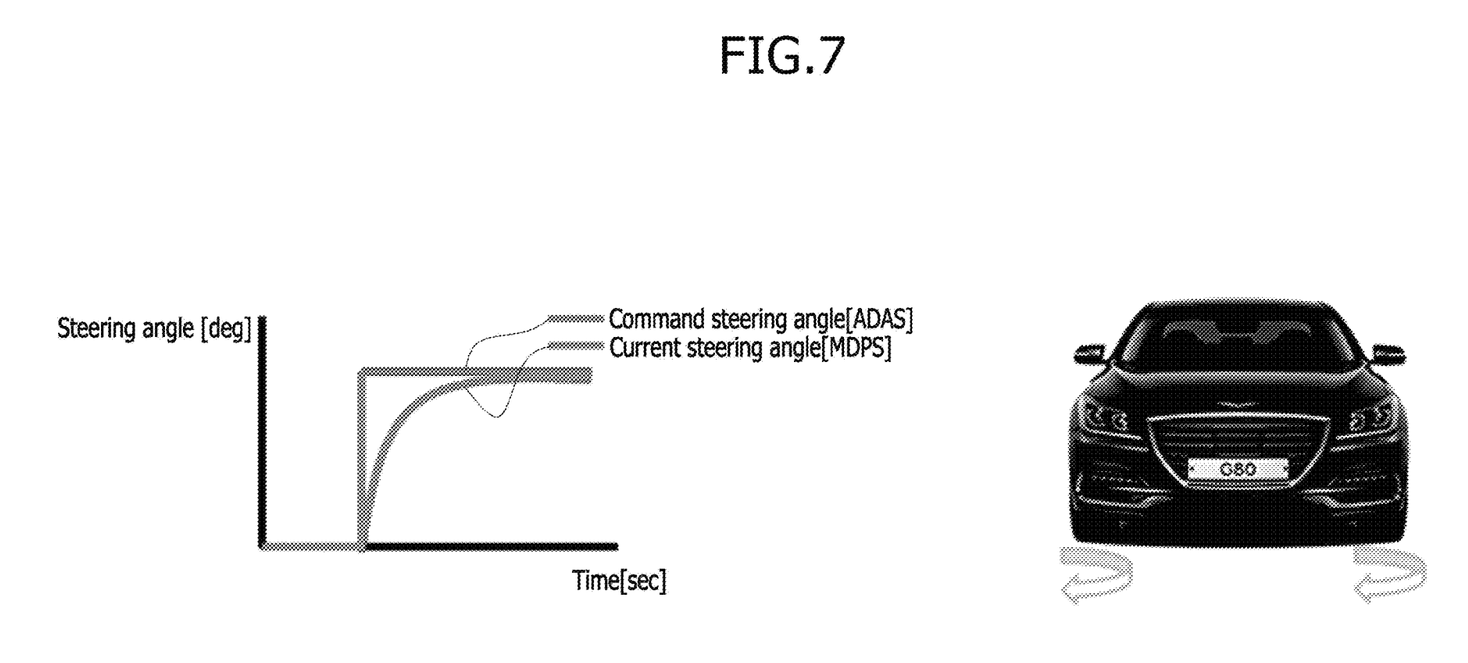
FIG. 7 is a diagram illustrating a steering angle change due to an abnormally-large command steering angle, according to an embodiment of the present disclosure.

FIG. 1 is a block diagram illustrating a configuration of an apparatus for compensating for a steering error in an advanced driving assistance system according to an embodiment of the present disclosure. FIG. 2 is a diagram illustrating a steering angle change due to a command steering angle at or above a threshold or at a level that can cause roll-over, according to the related art. FIG. 3 is a diagram illustrating a steering angle change due to a command steering angle at or above a threshold or at a level that can cause roll-over, according to an embodiment of the present disclosure. FIG. 4 is a diagram illustrating a steering angle change due to noise or a meaningless leftward and rightward command steering angle, according to the related art. FIG. 5 is a diagram illustrating a steering angle change due to noise or a meaningless leftward and rightward command steering angle, according to an embodiment of the present disclosure. FIG. 6 is a diagram illustrating a steering angle change due to an abnormally-large command steering angle, according to the related art. FIG. 7 is a diagram illustrating a steering angle change due to an abnormally-large command steering angle, according to an embodiment of the present disclosure.

Referring to FIG. 1, the apparatus for compensating for a steering error in an advanced driving assistance system according to the embodiment of the present disclosure includes a command steering angle correction module 100 and a motor control unit 200.

The command steering angle correction module 100 corrects a command steering angle according to whether or not the command steering angle input from the advanced driving assistance system (ADAS) (not illustrated) satisfies a preset error compensation condition.

That is, in cases where the error compensation condition is satisfied, for example, in a case where an abnormally-large command steering angle at which a phenomenon such as an overshoot can occur is instantaneously applied from the advanced driving assistance system, in a case where noise is introduced into a vehicle, in a case where a meaningless leftward and rightward steering input continues to be applied to a driving direction of the vehicle, in which a decrease in riding comfort, discomfort with traveling, or the like can occur, and in a case where, during autonomous driving, there is a likelihood that lateral acceleration will exceed that stipulated in the pertinent law and that roll-over will be caused, the command steering angle correction module 100 corrects an abnormal command steering angle input from the advanced driving assistance system.

To this end, the command steering angle correction module 100 includes a command steering angle restriction module 110, a vibration attenuation module 120, and a command steering angle attenuation module 130.

The command steering angle restriction module 110 detects lateral acceleration on the basis of the command steering angle, restricts the command steering angle according to the lateral acceleration, and inputs the restricted command steering angle into the command steering angle attenuation module 130.

The command steering angle restriction module 110 includes a vehicle modeling unit 111 and a command steering angle restriction unit 112.

The vehicle modeling unit 111 detects the lateral acceleration on the basis of the command steering angle and a vehicle speed and detects a maximum necessary steering angle that is possible at a current vehicle speed, according to the lateral acceleration, using a vehicle model.

That is, the command steering angle at which there is the likelihood that the lateral acceleration will exceed that stipulated in the pertinent law and that roll-over will be caused may be input from the advanced driving assistance system. Accordingly, the vehicle modeling unit 111 substitutes the command steering angle and the vehicle speed into a vehicle model equation to calculate a side slip angle and a yaw rate and detects the lateral acceleration using the calculated side slip angle and yaw rate. Subsequently, the vehicle modeling unit 111 determines whether or not the detected lateral acceleration is at or above a preset setting value of the lateral acceleration. When a result of the determination is that the lateral acceleration is at or above the preset setting value of the lateral acceleration, the vehicle modeling unit 111 detects in real time the maximum necessary steering angle that is possible at the current vehicle speed, using the vehicle model.

The command steering angle restriction unit 112 compares the necessary steering angle detected by the vehicle modeling unit 111 and the command steering angle input from the advanced driving assistance system, detects a necessary reduction steering angle for decreasing the command steering angle by the necessary steering angle, and imposes the restriction of decreasing the command steering angle by the necessary reduction steering angle.

From FIG. 2, it can be seen that, in a case where the command steering angle at which there is the likelihood that the lateral acceleration will exceed that stipulated in the pertinent law and that roll-over will be caused is input from the advanced driving assistance system, the steering angle approaches the command steering angle, thereby making vehicle driving unstable.

From FIG. 3, it can be seen that, in the case where the command steering angle at which there is the likelihood that the lateral acceleration will exceed that stipulated in the pertinent law and that roll-over will be caused is input from the advanced driving assistance system, the command steering angle restriction module 110 subtracts the necessary reduction steering angle from the command steering angle input from the advanced driving assistance system, and thus the current steering angle is restricted, thereby making the vehicle driving stable.

The vibration attenuation module 120 attenuates abnormal vibration at the command steering angle on the basis of abnormal vibration in a leftward and rightward direction, of the command steering angle.

The vibration attenuation module 120 includes a vibration detection unit 121 and a filter unit 122.

When a steering angular velocity changes in sign a preset number of times or greater for a preset setting time, the vibration detection unit 121 determines that abnormal vibration occurs at the command steering angle.

That is, in a case where noise is introduced abnormally into the command steering angle input from the advanced driving assistance system, or in a case where a meaningless leftward and rightward steering input continues to be applied to a driving direction, the vibration detection unit 121 detects these phenomena. In this case, the vibration detection unit 121 detects the steering angular velocity of the command steering angle from the command steering angle input from the advanced driving assistance system, and counts the number of times that the detected steering angular velocity changes in sign. When the number of times that the steering angular velocity changes in sign for a preset setting time is equal to or greater than the preset setting number of times, the vibration detection unit 121 determines that the abnormal vibration occurs.

The filter unit 122 detects a center frequency on the basis of a vibration frequency due to the abnormal vibration determined by the vibration detection unit 121 and removes the vibration frequency on the basis of the detected center frequency.

As the filter unit 122, an active reduction filter, for example, a notch filter, a lead-lag filter, or a low pass filter (LPF) may be employed.

From FIG. 4, it can be seen that, because noise is abnormally introduced into the command steering angle input from the advanced driving assistance system, or because the meaningless leftward and rightward steering input continues to be applied to the driving direction, the current steering angle changes according to the command steering angle, thereby making the vehicle driving an unstable state.

From FIG. 5, it can be seen that, in the case where noise is introduced abnormally into the command steering angle input from the advanced driving assistance system, or in the case where the meaningless leftward and rightward steering input continues to be applied to the driving direction, the command steering angle restriction module 110 removes the vibration frequency of the command steering angle, and thus vibration at the current steering angle is attenuated, thereby making the vehicle driving stable.

The command steering angle attenuation module 130 decreases the command steering angle on the basis of an amount of change in the command steering angle.

The command steering angle attenuation module 130 includes an amount-of-change detection unit 131 and a command steering angle attenuation unit 132.

The amount-of-change detection unit 131 detects an amount of change in the command steering angle that is input through the command steering angle restriction module 110 and the vibration attenuation module 120 from the advanced driving assistance system. As the amount-of-change detection unit 131, a differentiator may be employed.

The command steering angle attenuation unit 132 compares the amount of change in the command steering angle, which is detected by the amount-of-change detection unit 131, with a preset setting value of the amount of change in the command steering angle, and decreases the amount of change in the command steering angle according to a result of the comparison.

The setting value of the amount of change in the command steering angle is a preset command steering angle at which a decrease in riding comfort, the roll-over, or the like may occur.

In this case, when the command steering angle input from the advanced driving assistance system is at or above the setting value of the amount of change in the command steering angle, the command steering angle attenuation unit 132 decreases a proportional-integral gain (PI gain) of a position controller and thus decreases the command steering angle.

In addition, the command steering angle attenuation unit 132 may decrease the PI gain when the vehicle drives at a high speed, and thus may decrease the noise that is introduced into the vehicle, thereby decreasing discomfort with steering during autonomous driving.

From FIG. 6, it can be seen that, in a case where the abnormally-large command steering angle is input from the advanced driving assistance system, the current steering angle changes greatly, and thus an overshot phenomenon occurs in the vehicle.

From FIG. 7, it can be seen that, in the case where the abnormally-large command steering angle is input from the advanced driving assistance system, the command steering angle is decreased by the command steering angle attenuation module 130, and thus the current steering angle is prevented from changing abruptly, thereby making the vehicle driving stable.

The motor control unit 200 controls a motor of a motor-driven power steering system according to the command steering angle that is corrected by the command steering angle correction module 100 and includes a speed controller 210 and an electric current controller 220.

The speed controller 210 and the electric current controller 220 control a motor speed and a driving electric current, respectively, of the motor-driven power steering system according to the corrected command steering angle that is input from the command steering angle correction module 100. Thus, although the abnormal command steering angle is input from the advanced driving assistance system, the vehicle driving can be made to be stable.

A method of compensating for a steering error in an advanced driving assistance system according to an embodiment of the present disclosure will be described in detail below with reference to FIG. 8.

Figure 8:
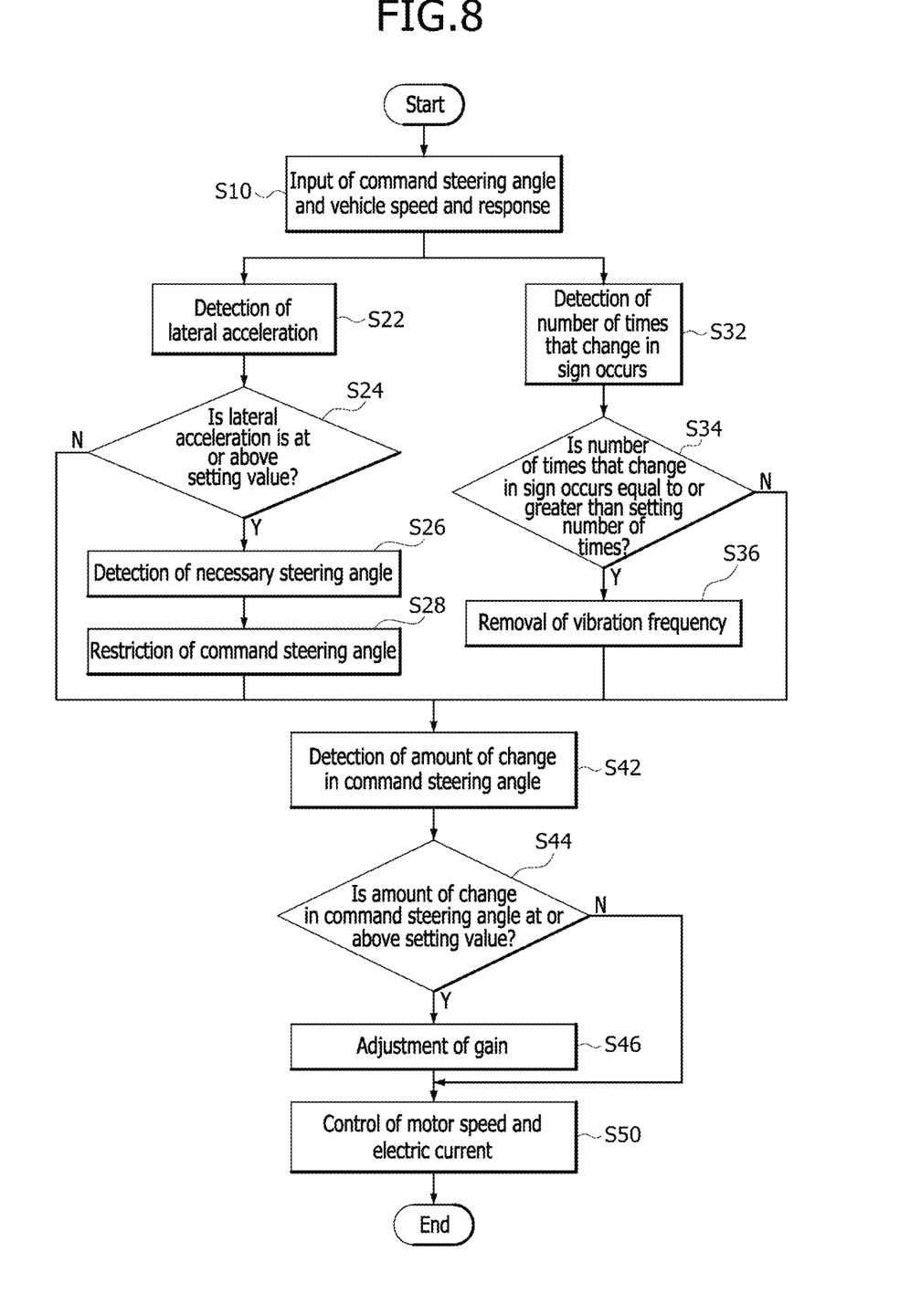
FIG. 8 is a flowchart illustrating a method of compensating for a steering error in an advanced driving assistance system according to an embodiment of the present disclosure.

FIG. 8 is a flowchart illustrating the method of compensating for a steering error in an advanced driving assistance system according to the embodiment of the present disclosure.

Referring to FIG. 8, the command steering angle is input from the advanced driving assistance system into the command steering angle restriction module 110 and the vibration attenuation module 120 (S10).

The command steering angle restriction module 110 substitutes the command steering angle and the vehicle speed into the vehicle model equation to calculate the side slip angle and the yaw rate, and detects the lateral acceleration using the calculated side slip angle and yaw rate (S22). Subsequently, the command steering angle restriction module 110 determines whether or not the detected lateral acceleration is at or above the preset setting value of the lateral acceleration (S24). When the result of the determination is that the lateral acceleration is at or above the preset setting value of the lateral acceleration, the command steering angle restriction module 110 detects in real time the maximum necessary steering angle that is possible at the current vehicle speed, using the vehicle model (S26).

Next, the command steering angle restriction module 110 compares the necessary steering angle detected as described above and the command steering angle input from the advanced driving assistance system, detects the necessary reduction steering angle for decreasing the command steering angle by the necessary steering angle, and imposes the restriction of decreasing the command steering angle by the necessary reduction steering angle (S28).

Meanwhile, the vibration attenuation module 120 detects the steering angular velocity of the command steering angle from the command steering angle input from the advanced driving assistance system, counts the number of times that the detected steering angular velocity changes in sign (S32), and determines whether or not the number of times that the detected steering angular velocity changes in sign for the preset setting time is equal to or greater than the preset setting number of times that the change in sign occurs (S34).

When the result of the determination in Step S36 is that the number of times that the change in sign occurs is equal to or greater than the setting number of times, the vibration attenuation module 120 sets the center frequency according to the number of times that the change in sign occurs for the setting time and removes the vibration frequency according to the center frequency (S36).

Subsequently, the command steering angle attenuation module 130 detects the amount of change in the command steering angle, which is input through the command steering angle restriction module 110 and the vibration attenuation module 120 from the advanced driving assistance system (S42), compares the detected amount of change in the command steering angle with the preset value of the amount of change in the command steering angle, and determines whether or not the amount of change in the command steering angle is at or above the setting value of the amount of change in the command steering angle (S44).

When the result of the determination in Step S44 is that the amount of change in the command steering angle is at or above the setting value of the amount of change in the command steering angle, the command steering angle attenuation module 130 decreases the proportional-Integral gain (PI gain) of the position controller (S46) and thus decreases the command steering angle.

Subsequently, the motor control unit 200 controls each of the motor speed and the driving electric current of the motor-driven power steering system according to the command steering angle that is corrected by the command steering angle correction module 100 (S50).

In this manner, the apparatus for and the method of compensating for a steering error in an advanced driving assistance system according to aspects of the present disclosure compensate for the abnormal command steering angle that is input from the advanced driving assistance system, and thus ensure the stability of the vehicle driving and the safety of a driver.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for compensating for a steering error in an advanced driving assistance system, the apparatus comprising:
a command steering angle corrector configured to correct a command steering angle, in response to the command steering angle input from the advanced driving assistance system satisfying a preset error compensation condition; and
a motor controller configured to control a motor of a motor-driven power steering system according to the corrected command steering angle,
wherein the command steering angle corrector comprises
a command steering angle restrictor configured to detect lateral acceleration on the basis of the command steering angle and to restrict the command steering angle according to the lateral acceleration,
a vibration attenuator configured to detect a change in the command steering angle due to abnormal vibration in a leftward and rightward direction of the command steering angle and to attenuate the abnormal vibration at the command steering angle according to the detected change, and
a command steering angle attenuator configured to detect an amount of change in the command steering angle and to decrease the command steering angle according to the amount of change in the command steering angle.

2. The apparatus of claim 1, wherein the command steering angle attenuator comprises:
an amount-of-change detector configured to detect the amount of change in the command steering angle; and
a command steering angle attenuator configured to compare the amount of change in the command steering angle with a preset setting value, and to decrease the amount of change in the command steering angle according to a result of the comparison.

3. The apparatus of claim 1, wherein the vibration attenuator comprises:
a vibration detector configured to detect the abnormal vibration at the command steering angle on the basis of a number of times that a steering angular velocity of the command steering angle changes in sign; and
a filter configured to remove a vibration frequency according to the number of times that the steering angular velocity changes in sign.

4. The apparatus of claim 3, wherein the vibration detector is further configured to determine whether or not the number of times that the steering angular velocity changes in sign for a time interval is equal to or greater than a threshold.

5. The apparatus of claim 3, wherein the filter is further configured to:
- detect the vibration frequency according to the number of times that the steering angular velocity changes in sign,
- set a center frequency according to the vibration frequency, and
- remove the vibration frequency according to the center frequency.

6. The apparatus of claim 1, wherein the command steering angle restrictor comprises:
- a vehicle modeler configured to detect the lateral acceleration on the basis of the command steering angle and a vehicle speed, and to detect a maximum steering angle for the vehicle speed, according to the lateral acceleration using a vehicle model; and
- a command steering angle reducer configured to detect a reduction steering angle on the basis of the command steering angle and to decrease the command steering angle by the reduction steering angle.

7. The apparatus according to claim 6, wherein the vehicle modeler is further configured to detect the steering angle, in response to the lateral acceleration being at or above a preset setting value of the lateral acceleration.

8. A method of compensating for a steering error in an advanced driving assistance system, the method comprising:
- correcting, by a command steering angle corrector, a command steering angle, in response to the command steering angle input from the advanced driving assistance system satisfying a preset error compensation condition; and
- controlling, by a motor controller, a motor of a motor-driven power steering system according to the corrected command steering angle,
- wherein the correcting of the command steering angle comprises
  - detecting lateral acceleration on the basis of the command steering angle and restricting the command steering angle according to the lateral acceleration
  - detecting a change in the command steering angle, due to abnormal vibration in a leftward and rightward direction of the command steering angle and attenuating the abnormal vibration at the command steering angle according to the detected change, and
  - detecting an amount of change in the command steering angle and decreasing the command steering angle according to the amount of change in the command steering angle.

9. The method of claim 8, wherein the decreasing of the command steering angle comprises:
- detecting the amount of change in the command steering angle; and
- comparing the amount of change in the command steering angle with a preset setting value and decreasing the amount of change in the command steering angle according to a result of the comparison.

10. The method of claim 8, wherein the attenuating of the abnormal vibration at the command steering angle comprises:
- detecting the abnormal vibration at the command steering angle on the basis of a number of times that a steering angular velocity of the command steering angle changes in sign; and
- removing a vibration frequency according to the number of times that the steering angular velocity changes in sign.

11. The method of claim 10, wherein the detecting of the abnormal vibration at the command steering angle comprises determine whether or not the number of times that the steering angular velocity changes in sign for a preset setting time is equal to or greater than the preset setting number of times that the change in sign occurs.

12. The method of claim 10, wherein the removing of the vibration frequency comprises detecting the vibration frequency according to the number of times that the steering angular velocity changes in sign, setting a center frequency according to the vibration frequency, and removing the vibration frequency according to the center frequency.

13. The method of claim 8, wherein the decreasing of the command steering angle comprises:
- detecting the lateral acceleration on the basis of the command steering angle and a vehicle speed, and detecting a maximum steering angle for the current vehicle speed, according to the lateral acceleration, using a vehicle model; and
- detecting a reduction steering angle on the basis of the command steering angle and decreasing the command steering angle by the reduction steering angle.

14. The method of claim 13, wherein the detecting of the steering angle using the vehicle model comprises detecting the steering angle, in response to the lateral acceleration being at or above a preset setting value of the lateral acceleration.

15. An apparatus for compensating for a steering error in an advanced driving assistance system, the apparatus comprising:
- a command steering angle corrector configured to correct a command steering angle, in response to the command steering angle input from the advanced driving assistance system satisfying a preset error compensation condition; and
- a motor controller configured to control a motor of a motor-driven power steering system according to the corrected command steering angle,
- wherein the command steering angle corrector comprises a vibration attenuator configured to detect a change in the command steering angle due to abnormal vibration in a leftward and rightward direction of the command steering angle based on a number of times that a steering angular velocity of the command steering angle changes in sign being equal to or greater than a threshold, and to attenuate the abnormal vibration according to the detected change.

* * * * *